(12) United States Patent
Takuma et al.

(10) Patent No.: US 6,745,116 B2
(45) Date of Patent: Jun. 1, 2004

(54) STEERING ANGLE SENSOR FOR VEHICLE

(75) Inventors: Emi Takuma, Shizuoka-ken (JP); Takashi Sato, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/642,217

(22) Filed: Aug. 18, 2003

(65) Prior Publication Data

US 2004/0059486 A1 Mar. 25, 2004

(30) Foreign Application Priority Data

Sep. 24, 2002 (JP) ..................................... P 2002-277189

(51) Int. Cl.[7] ................................................ G06F 7/00
(52) U.S. Cl. ......................... 701/41; 180/446; 180/444
(58) Field of Search ............................... 180/444, 446, 180/443, 410; 701/41, 42; 324/207.13, 207.25

(56) References Cited

U.S. PATENT DOCUMENTS

| | | | | |
|---|---|---|---|---|
| 4,934,473 A | * | 6/1990 | Fushimi et al. ............. | 180/446 |
| 6,041,884 A | * | 3/2000 | Shimizu et al. ............. | 180/443 |
| 6,427,104 B1 | * | 7/2002 | Matsushita et al. .......... | 701/41 |
| 6,528,990 B1 | * | 3/2003 | Nyce ..................... | 324/207.13 |
| 6,648,096 B2 | * | 11/2003 | Berg et al. ................ | 180/444 |

* cited by examiner

Primary Examiner—Richard M. Camby
(74) Attorney, Agent, or Firm—Finnegan, Henderson, Farabow, Garrett, & Dunner, L.L.P.

(57) ABSTRACT

A second gear rotating at a rotation speed faster than a rotation speed of a first gear while meshing therewith, a magnet provided on the second gear and rotating together therewith, and a small angle detection magnetic sensor disposed in a vicinity of where the second gear is fixed and configured to detect a magnetic line of force of the magnet are provided. Meanwhile, a third gear rotating at a rotation speed slower than the rotation speed of the second gear in synchronization with the first gear, a magnet provided on the third gear and rotating together therewith, and a large angle detection magnetic sensor disposed in a vicinity of where the third gear is fixed and configured to detect a magnetic line of force of the magnet are provided. A rotation angle of a steering shaft is calculated based on angle data detected in the small angle detection magnetic sensor and the large angle detection magnetic sensor.

4 Claims, 9 Drawing Sheets

STEERING ANGLE SENSOR FOR VEHICLE

BACKGROUND OF THE INVENTION

1. Field of the Invention

The present invention relates to a steering angle sensor detecting a rotation angle of a steering mounted on a vehicle, and particularly, to a technology for improving accuracy of the detection.

2. Description of the Related Art

As a conventional example of a steering angle sensor mounted on a vehicle, there is one using a system, in which a large diameter gear is disposed coaxially to a steering, and further, a small diameter gear meshing with this large diameter gear is disposed, and a rotation angle of this small diameter gear is detected.

Figure 1:
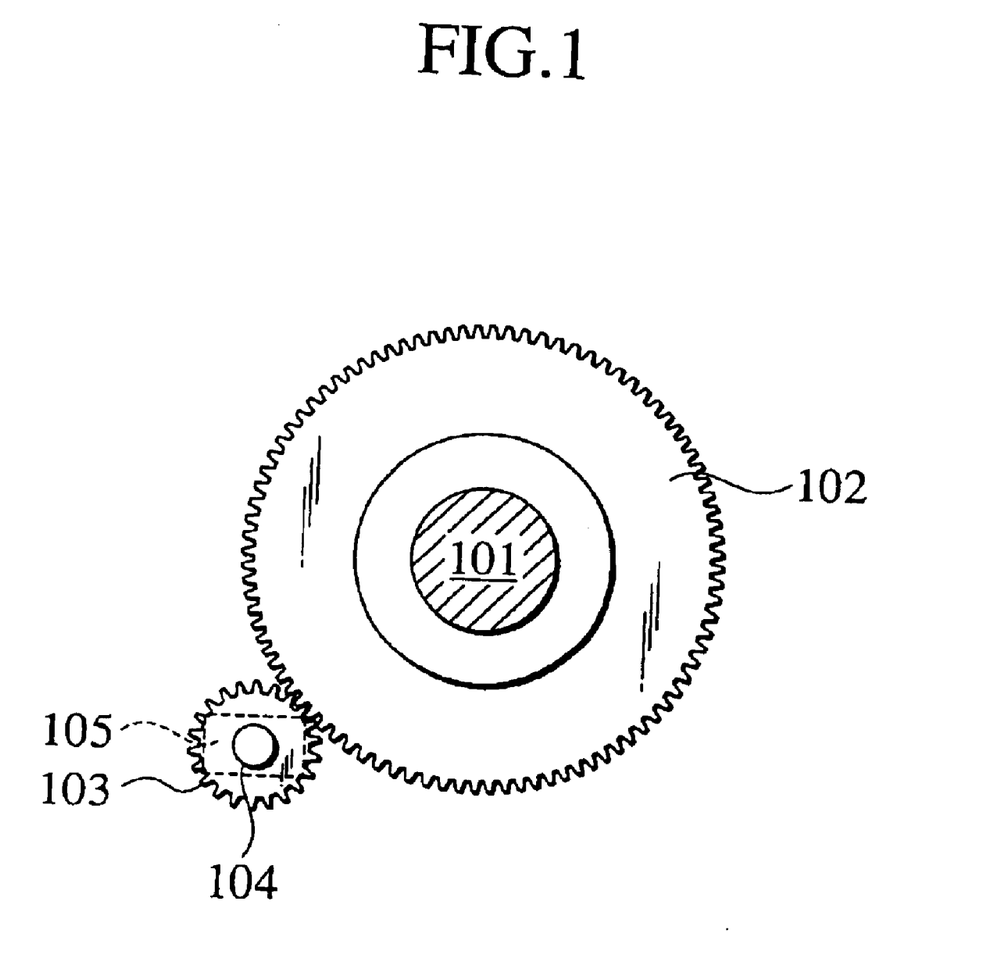
FIG. 1 is an explanatory view showing a configuration of a conventional steering angle sensor.

As shown in FIG. 1, accompanied with the steering shaft 101 rotates, the large diameter gear 102 rotates, and the small diameter gear 103 meshing therewith is rotationally driven. In addition, the magnet 104 is disposed on the center of the small diameter gear 103, and further, the hall IC 105 is disposed in the vicinity of where the magnet 104 is disposed. Hence, the direction of the magnet 104 can be detected by the hall IC 105, and eventually, the rotation angle of the small diameter gear 103 can be detected.

Accordingly, the rotation angle of the steering shaft 101 can be calculated based on output signals of the hall IC 105.

However, in the steering angle sensor thus configured, the number of teeth of the small diameter gear 102 is smaller than that of the large diameter gear 102, in which, for example, a ratio of the numbers is 1:4. Moreover, in the steering shaft 101, the total steering angle is approximately less than 4 turns, and therefore, the small diameter gear 103 will make a total of approximately 15 turns.

Hence, though the hall IC 105 can detect the rotation angle of the small diameter gear 103, the hall IC 105 cannot recognize the absolute position of the steering shaft 101, that is, cannot recognize how many turns the small diameter gear 103 has made among the total of 15 turns. Therefore, the conventional steering angle sensor has had a drawback that the sensor must detect the steering angle with reference to a steering angle of the steering shaft 101 of 0 degree, that is, with reference to a straight ahead position of the vehicle, which makes it impossible to detect the steering angle until a reference position signal to notify that the vehicle is at the straight ahead position is given from the vehicle.

Meanwhile, in order to solve this problem, there has been proposed a method of constantly monitoring variations of the steering angle by energizing the steering angle sensor even when the ignition switch of the vehicle is turned off. However, this method has caused a problem that a heavy load is put on a battery because electric power is consumed even when the ignition switch is turned off.

SUMMARY OF THE INVENTION

As described above, the conventional steering angle sensor has had the problem that the sensor cannot detect the steering angle until the straight ahead position of the vehicle is detected. Furthermore, the method in which the steering angle sensor is energized even when the ignition switch is turned off has had a drawback that the method was impractical because more electric power is consumed.

The present invention has been created in order to solve the conventional problem as described above. It is an object of the present invention to provide a steering angle sensor capable of detecting a steering angle of a vehicle by a simple method.

In order to achieve the foregoing object, the present invention provides a steering angle sensor, including a first gear rotating in synchronization with a steering shaft, a second gear rotating in synchronization with the first gear at a rotation speed faster than a rotation speed of the first gear, a small angle detection magnet provided on the second gear and rotating together with the second gear, a small angle detection magnetic sensor disposed in a vicinity of where the second gear is fixed and configured to detect a magnetic line of force of the small angle detection magnet, a third gear rotating at a rotation speed slower than the rotation speed of the second gear in synchronization with the first gear, a large angle detection magnet provided on the third gear and rotating together with the third gear, and a large angle detection magnetic sensor disposed in a vicinity of where the third gear is fixed and configured to detect a magnetic line of force of the large angle detection magnet, wherein a rotation angle of the steering shaft is calculated based on angle data detected in the small angle detection magnetic sensor and the large angle detection magnetic sensor.

The steering angle sensor may be configured such that the small angle detection magnetic sensor supplies a periodic signal of a triangular wave accompanied by a rotational movement of the second gear, and that the large angle detection magnetic sensor supplies a periodic signal of a triangular wave accompanied by a rotational movement of the third gear, in which the periodic signal has a longer period than a period of the periodic signal supplied by the small angle detection magnetic sensor.

The steering angle sensor may be configured such that detection data by the small angle detection magnetic sensor and detection data by the large angle detection magnetic sensor are set different from each other in accordance with an absolute angular position of the steering shaft.

The steering angle sensor may be configured such that a signal, in which a gradient of a detection value detected by the large angle detection magnetic sensor is made to coincide with a gradient of a detection value detected by the small angle detection magnetic sensor, is created as a conversion signal, and that a difference between the conversion signal and a detection result by the small angle detection magnetic sensor is calculated, and it is determined as to which period in a periodic waveform supplied from the large angle detection magnetic sensor an absolute steering angle of the steering shaft belongs in accordance with the remainder when a value of the difference is divided by a predetermined number of steps.

DETAILED DESCRIPTION OF THE PREFERRED EMBODIMENT

Embodiments of the present invention will be described below based on the drawings.

Figure 2:
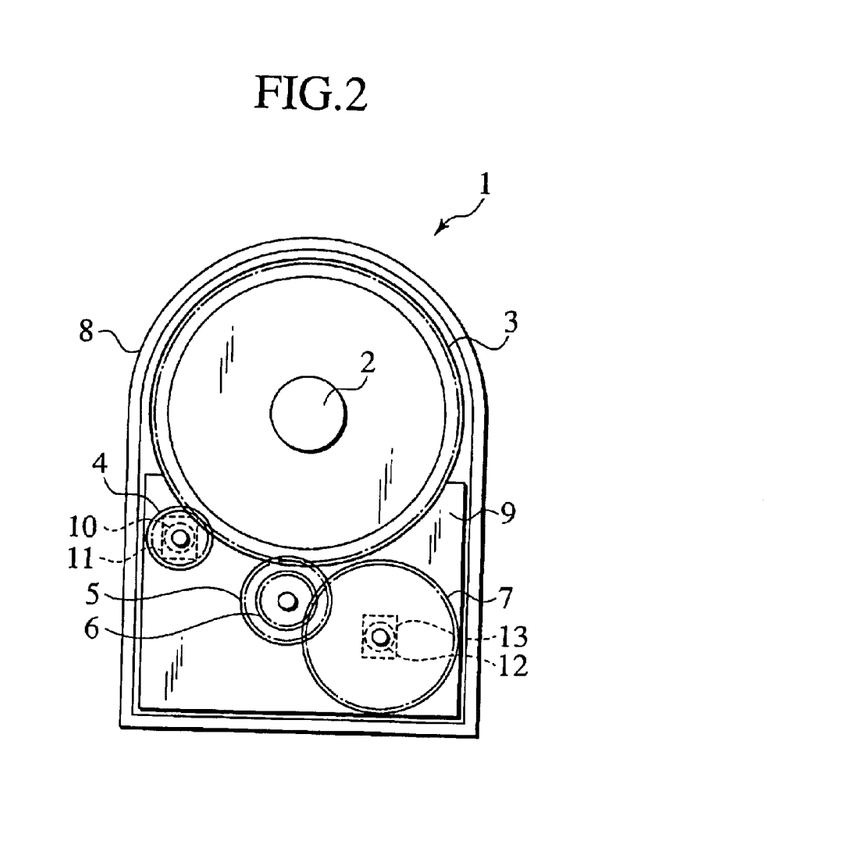
FIG. 2 is a constitutional view schematically showing a steering angle sensor according to an embodiment of the present invention.

FIG. 2 is a constitutional view schematically showing a steering angle sensor according to a first embodiment of the present invention. As shown in the drawing, this steering angle sensor 1 is housed in the case 8, and includes the gear (first gear) 3 rotating in synchronization with the steering shaft 2 mounted on a vehicle, the gear (second gear) 4 meshing with the gear 3 and rotating in synchronization therewith, and the gear 5 meshing with the gear 3 and rotating in synchronization therewith.

Moreover, the steering angle sensor 1 includes the gear 6 that is coupled coaxially to the gear 6 and smaller in diameter than the gear 5, and the gear (third gear) 7 meshing with the gear 6. The gears 3 to 7 are each provided on the board 9.

The magnet (small angle detection magnet) 10 of 2-pole magnetization is provided at the center of the gear 4. Moreover, the magnetic sensor (small angle detection magnetic sensor) 11 for detecting the direction of the magnetic line of force of the magnet 10 is provided on the board 9 in the vicinity of where the magnet 10 is disposed.

In a similar way, the magnet (large angle detection magnet) 12 of 2-pole magnetization is provided at the center of the gear 7, and the magnetic sensor (large angle detection magnetic sensor) 13 for detecting the direction of the magnetic line of force of the magnet 12 is provided on the board 9 in the vicinity of where the magnet 12 is fixed.

Figure 3:
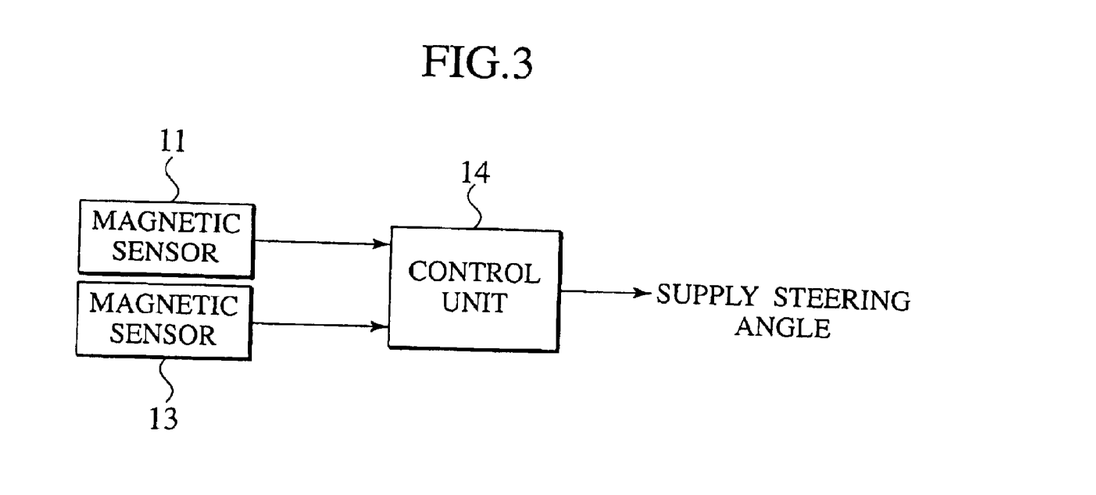
FIG. 3 is a block diagram showing a control system of the steering angle sensor according to the embodiment of the present invention.

FIG. 3 is a block diagram showing the control system of the steering angle sensor 1. As shown in the drawing, the respective magnetic sensors 11 and 13 are coupled to the control unit 14. In the control unit 14, the rotation angle of the steering shaft 2 is calculated based on detection signals supplied from the magnetic sensors 11 and 13.

Figure 4:
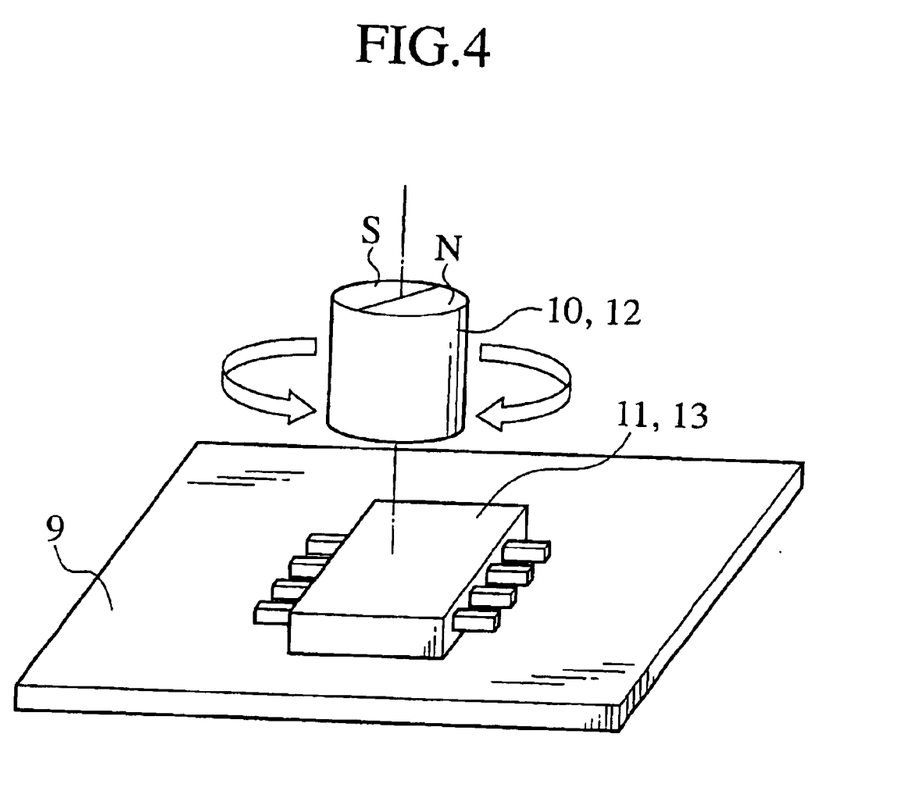
FIG. 4 is an explanatory view showing a positional relationship between a magnet and a magnetic sensor.

FIG. 4 is an explanatory view showing a positional relationship between the magnet 10 or 12 and the magnetic sensor 11 or 13. When the magnet 10 or 12 rotates as the gear 4 or 7 rotates, the magnetic sensor 11 or 13 disposed to face the magnet 10 or 12 detects the direction of this rotation. Therefore, the rotation angles of the gears 4 and 7 can be calculated based on the output signals from the magnetic sensors 11 and 13.

Each of the magnetic sensors 11 and 13 is configured to divide 360 [deg] of one rotation by $2^b$ and to supply digital signals of the divided angles. A gear speed ratio between the gear 3 and the gear 4 and a gear speed ratio of the gear 3 to the gear 7 (with the gears 5 and 6 Interposed therebetween) are set as below.

The respective periods c1 and c2 of the magnetic sensors 11 and 13 can be calculated by the following Expressions (1) and (2):

$$c1 = rez \times 2^b = 360/i1 \qquad (1)$$

$$c2 = 360/i2 \qquad (2)$$

where "rez" is resolving power (angular step of the magnetic sensor 11) of the steering angle sensor 1, "b" is the number of bits of the magnetic sensors 11 and 13, i1 and i2 are speed ratios of the gears 4 and 7 with respect to the gear 3, respectively, and c1 and c2 are periods of the magnetic sensors 11 and 13 with respect to the gear 3, respectively.

In order to uniquely combine the outputs of the magnetic sensors 11 and 13 in a range of the steering angle, the periods of the two magnetic sensors 11 and 13 are set to satisfy the condition of Expression (3):

$$(\text{least common multiple of } c1 \text{ and } c2) \geq (\text{steering angle range}) \qquad (3)$$

For example, in the case where the resolving power is set at 1 [deg], the number of bits of the magnetic sensor 11 or 13 is set at 6, and the steering angle range is set at ±1080 [deg], if the speed ratio i2 of the gear 7 is set at "2," the period c1 of the magnetic sensor 11 becomes 64 [deg], and the period c2 of the magnetic sensor 13 becomes 180 [deg]. In this case, the speed ratio i1 of the gear 4 becomes 5.625 (=360/64), and the speed ratio i2 of the gear 7 becomes 2 (=360/180).

The least common multiple of these periods becomes 2880 [deg], which is a value satisfying a usual steering angle range (±1080 [deg]) of an automobile.

Figure 5:
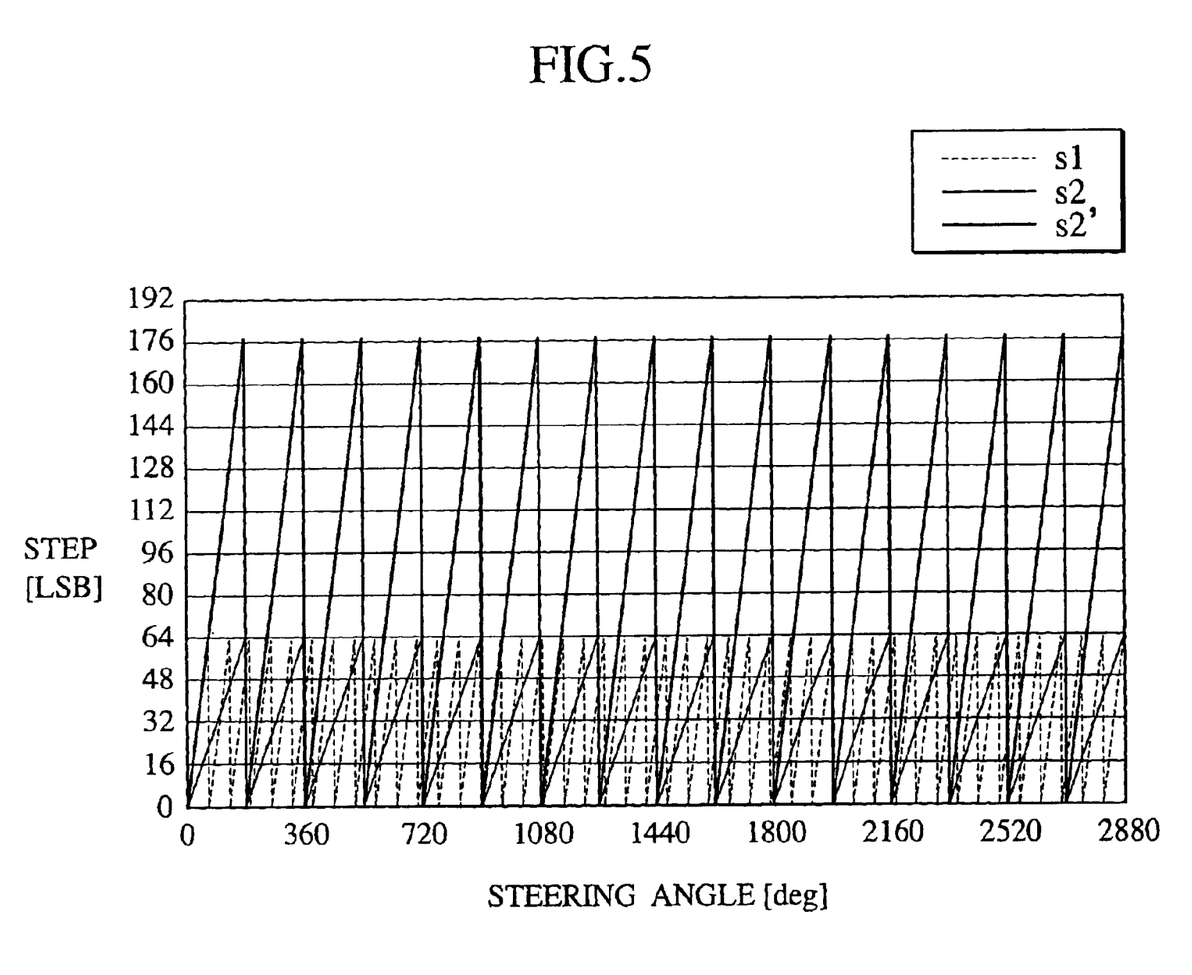
FIG. 5 is a characteristic diagram showing an output signal s1 of a magnetic sensor 11, an output signal s2 of a magnetic sensor 13 and a conversion signal s2' with respect to a steering angle of a steering shaft.

Changes of the output signals from the magnetic sensors 11 and 13 in the whole steering angle range in this case are shown in FIG. 5. Moreover, a detailed diagram thereof is shown in FIG. 6.

As shown in FIG. 5, the output signal s2 from the magnetic sensor 13 is changed in the period of 180 [deg] in a saw-teeth shape (triangular wave shape). The number of periods (number of the saw teeth shaped wave) of this output signal s2 is set at x2 (16 in this example). Meanwhile, the output signal of the magnetic sensor 11 is changed in the period of 64 [deg] in a saw-tooth shape. The number of periods of this reference signal s1 is set at x1 (45 in this example).

Furthermore, as represented in the aforementioned Expression (3), the least common multiple of c1 (64 [deg]) and c2 (180 [deg]) is set to be 1080 [deg] or more (specifically, 2880 [deg]). Therefore, there is no angular position where the output signal from the magnetic sensor 11 and the output signal from the magnetic sensor 13 become identical to each other in the respective steering angles of the steering shaft 2. In other words, if the output signals from the magnetic sensors 11 and 13 are obtained, the steering angle of the steering shaft 2 will be uniquely defined.

Figure 6:
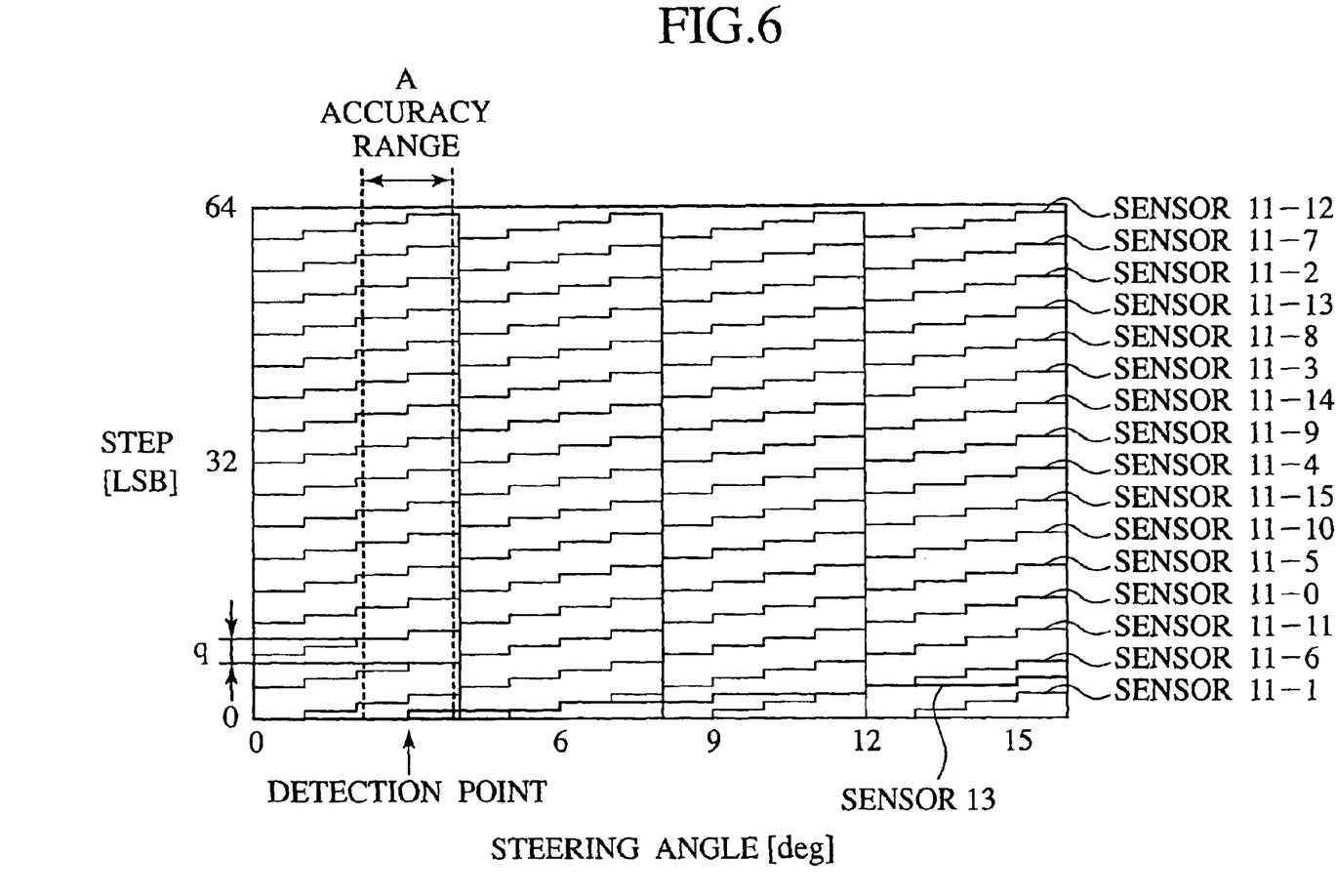
FIG. 6 is a characteristic diagram showing detection accuracy by the magnetic sensor 11.

FIG. 6 is an explanatory diagram showing the detection accuracy of the steering angles by the magnetic sensors 11 and 13, in which the respective periods of the output signals from the magnetic sensor 11 are shown with reference to the output signal of the magnetic sensor 13. Specifically, the sensors 11-0 to 11-15 show the output signal waveforms s1 of the magnetic sensor 11, which correspond to the first to sixteenth triangles of the output signal waveform s2 of the magnetic sensor 13 shown in FIG. 5. Moreover, the rise point of the waveform s1 (for three triangles of the waveform s1) corresponding to the first triangle of the waveform s2 and the rise point of the waveform s2 coincide with each other. Therefore, the output signal waveform of the sensor 11-0 starts from the origin (0, 0).

In addition, in the case where the detection point of the steering angle by the magnetic sensor 13 is 3 [deg], and a accuracy range in this case is present within a range shown by "A" in the drawing, if a detection error by the magnetic sensor 11 is larger than "q," the output signal from the magnetic sensor 13 cannot be made to correspond to the output signal from the magnetic sensor 11. Specifically, in the example shown in the diagram, it becomes impossible to identify whether the output signal Is the signal of the sensor 11-5 or 11-10, and consequently, the magnetic sensor 13 and the magnetic sensor 11 cannot be made to uniquely correspond to each other.

The range q where it is possible to recognize a relationship between outputs of periods of the magnetic sensor 11, which are adjacent to each other, in the accuracy range "A" of this magnetic sensor 13 can be calculated by the following Expression (4):

$$q=\{2^b-x1\times(\text{accuracy range [LSB] of magnetic sensor 13})\}/x2 \quad (4)$$

If this recognizable range q is larger than 1, the aforementioned unique definition will be enabled. In this case, if a mode of computing an absolute value based on the output value of the magnetic sensor is employed, the recognizable range q will be reduced. Therefore, this embodiment is configured to detect the rise point in the magnetic sensor 13 in order to increase the recognizable range q, and this embodiment is set to enable the detection of a more accurate steering angle position by excluding a digital error.

However, this error span largely contributes to the accuracy of the magnetic sensor 13. Hence, if an accurate magnetic sensor is used, it is unnecessary to employ the condition shown in Expression (4) and the method of detecting the rise point. In addition, the number of bits b and resolving power of the magnetic sensor 13 similarly contributes to the accuracy range. When the accuracy range of the magnetic sensor 13 is set at 1 [LSB], in the aforementioned example, the value of q becomes "1.1875 (>1)," which satisfies all the conditions.

Figure 7:
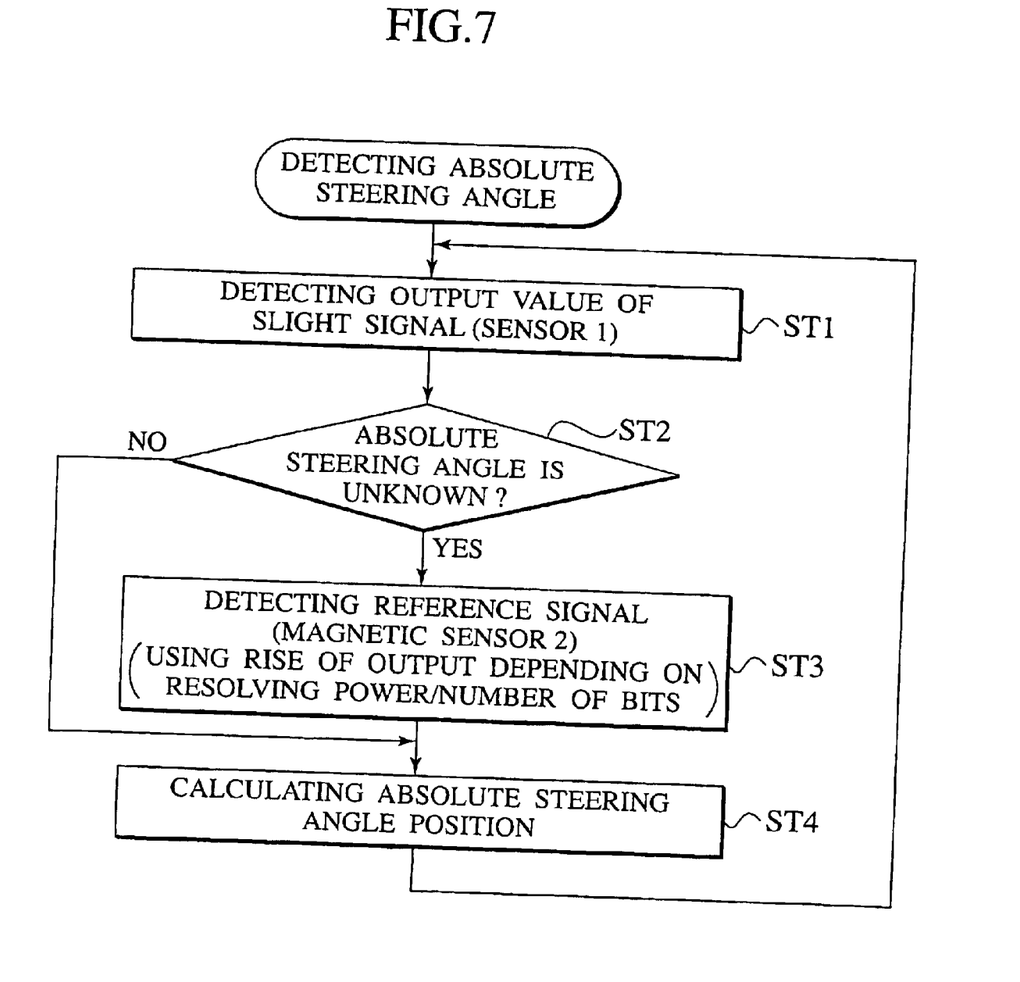
FIG. 7 is a flowchart showing an operation of a steering angle sensor according to a first embodiment of the present invention.

Next, the operation of this embodiment configured as described above will be explained with reference to the flowchart shown in FIG. 7.

Upon the start of the steering angle detection process of the steering shaft 2, the rotation angle of the gear 3 is detected by the magnetic sensor 11 (Step ST1), and this detection signal is supplied to the control unit 14. Thereafter, the control unit 14 determines whether the absolute steering angle of the steering shaft 2 can be calculated (Step ST2) based on this detection signal. When the absolute steering angle is unknown (YES at Step ST2), the rotation angle of the gear 7, which is detected by the magnetic sensor 13, is detected (Step ST3).

Thereafter, the absolute steering angle of the steering shaft 2 is calculated based on the detection signals of the magnetic sensors 11 and 13 (Step ST4).

In this case, if the output signals of the magnetic sensors 11 and 13 are obtained, the steering angle can be uniquely calculated, and therefore, the absolute steering angle of the steering shaft 2 can be detected securely and accurately.

As described above, the steering angle sensor 1 according to the first embodiment is configured such that the gear (second gear) 4 and the gear (third gear) 7, which rotate in synchronization with the gear (first gear) 3, are arranged, the rotation angles of the gears 4 and 7 are detected, and the steering angle of the steering shaft 2 is calculated based on these detection values. Therefore, it is made possible to detect an accurate steering angle position even for a slight angle variation.

Next, a second embodiment will be described. Because the apparatus configuration of the second embodiment is similar to those in the schematic view shown in FIG. 2 and the block diagram shown in FIG. 3, a description thereof will be omitted.

First, the principle of the second embodiment will be described.

In this embodiment, similar to the foregoing first embodiment, the speed ratios of the gears 4 and 7 are defined as i1 and i2, respectively. As shown in FIG. 5, the output signal of the magnetic sensor 11 is defined as the angle signal s1, and the output signal of the magnetic sensor 13 is defined as the reference signal s2.

The signal s2' (hereinafter, referred to as a conversion signal s2') obtained by converting the reference signal s2 such that a gradient identical to that of the angle signal s1 is given thereto is calculated by the following Expression (11):

$$s2'=s2\times i1/i2 \quad (11)$$

Subsequently, a difference between the conversion signal s2' calculated by Expression (11) and the angle signal s1 is computed, and the result is defined as a signal sig0. Specifically, the computation of the following Expression (12) is performed.

$$sig0=s2'-s1 \quad (12)$$

Figure 8:
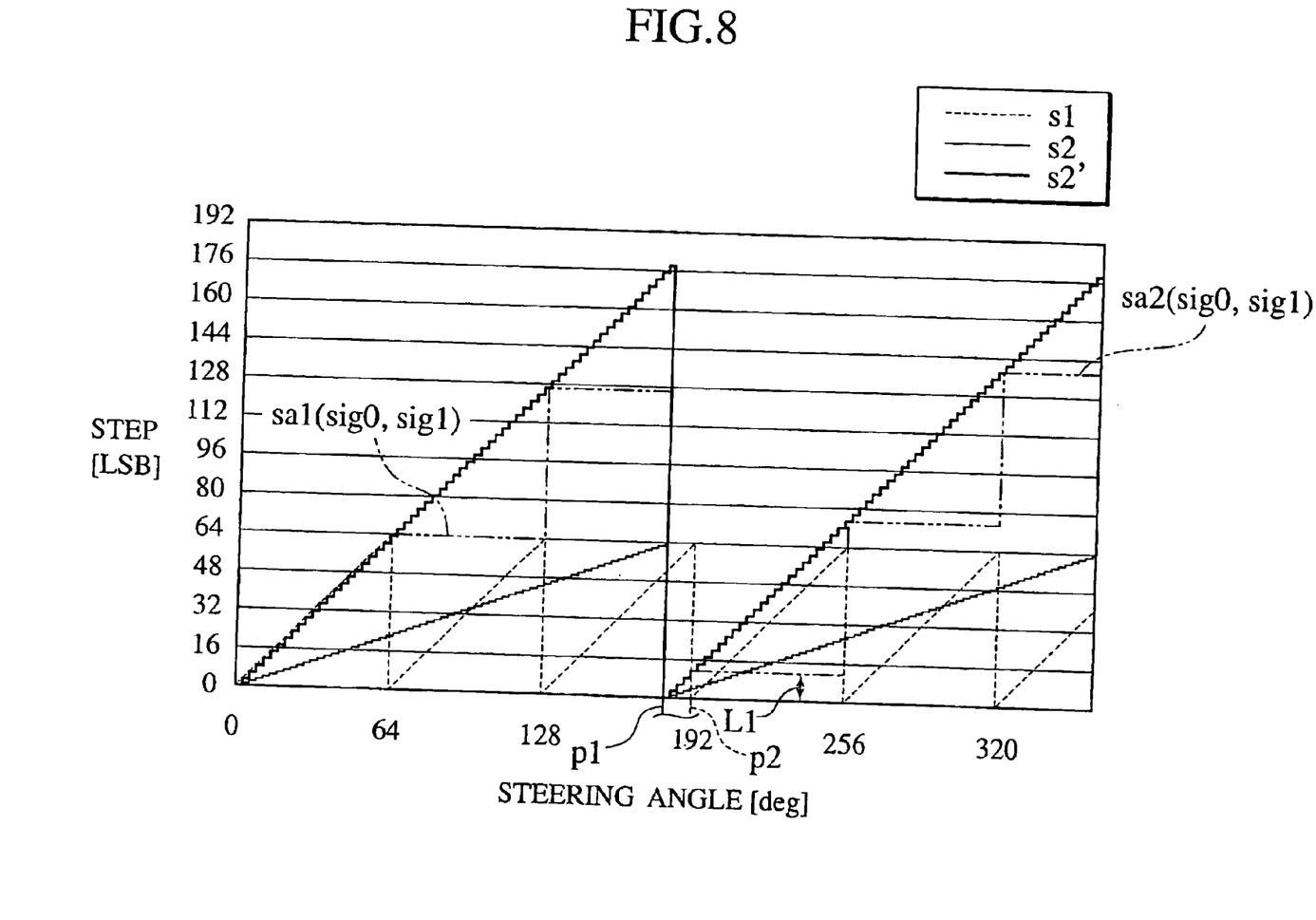
FIG. 8 is an explanatory diagram showing the characteristic diagram shown in FIG. 5 in detail.

Thereupon, this waveform sig0 becomes the waveform Sa1 increased in the form of a staircase as shown in FIG. 8. Moreover, as described above, the reference signal s2 is not a multiple of the angle signals s1. Therefore, the waveform sig0 becomes the waveform Sa2, which oscillates somewhat to the negative side at the drop portion of the conversion signal s2' in the first period, and is thereafter increased again in the form of a staircase. In this case, as shown by the points p1 and p2 of FIG. 8, the rise point of the conversion signal s2' and the rise point of the angle signal s1 will not coincide with each other.

Hence, the waveform Sa2 increased in the form of a staircase from the point p2 is located at a position somewhat shifted from the waveform Sa1 with respect to the step [LSB} (in the direction of the axis of ordinates of FIG. 8). Specifically, the waveform Sa2 is shored up by L1. In the next period (third period) of the signal s2', another positional shift (difference between the rise point of the signal s2' and the rise point of the signal s1) occurs. Therefore, a waveform in the form of a staircase, which is located at a position shifted from the waveforms Sa1 and Sa2 in the vertical direction, is obtained.

Accordingly, as shown in FIG. 8, the waveforms Sa1, Sa2, and so forth, which change in the forms of staircases with respect to the change of the rotation angle, are obtained in all the periods of the conversion signal s2'. Moreover, because the total of 16 signals s2 (or signals s2') are present as shown in FIG. 5, 16 waveforms changed in the forms of staircases, that is, the signals Sa1 to Sa16 will be present.

Subsequently, sig1 is calculated by adding a bias component δ to sig0 obtained by the aforementioned Expression (12). Specifically, sig1 is calculated by the following Expression (13):

$$sig1=sig0+\delta \quad (13)$$

Note that the bias component δ is a value set in order to average the variations of the actually detected signal s2.

Then, the signal sig1 calculated by Expression (13) is divided by the divisor $2^b$ (e.g., $2^b=64$, where b=6) of the magnetic sensor 11, and the remainder t2 in this case is calculated. Specifically, t2 is calculated by the following Expression (14):

$$t2 = \text{remainder of } (sig1/2^b) = \text{remainder of } (sig1/64) \quad (14)$$

Herein, as shown in FIG. 8, a scale the same as that of the steering angle is set for the number of steps in the axis of ordinates. Consequently, the respective waveforms s1, s2 and s2' are changed at a gradient of 45°. Both of the waveform Sa1 (waveform in the first period) of sig1 and the waveform s1 start from the origin (0, 0), and therefore, sig1 is divisible by 64. Specifically, t2 is equal to 0.

Moreover, as previously mentioned, the number of steps in the waveform Sa2 (waveform in the second period) of sig1 is increased by the amount shown by L1 in the drawing because the points p1 and p2 are shifted from each other. Consequently, the result of the computation by Expression (14) becomes L1. L1 exhibits different values in all the 16 waveforms Sa1 to Sa16.

In other words, if t2 is calculated by Expression (14), a corresponding waveform can be detected from the 16 present waveforms s2 (or s2') based on the value of this t2.

A detection procedure of the corresponding waveform from the 16 waveforms will be described below in detail.

Now, the speed ratio of the magnetic sensor 11 is set at 5.625, the speed ratio of the magnetic sensor 13 is set at 2, b is set equal to 6, and the numbers of the 16 waveforms Sa1 to Sa16 of s2 (or s2') are respectively set at 0 to 15, represented by j. Specifically, for the waveform Sa1, j is equal to 0 for Sa2, j is equal to 1; and finally for Sa16, j is equal to 15.

Thereafter, the computation represented by the following Expression (15) is performed for the respective numbers.

$$t1 = 2^b \times [\{\text{value obtained by rounding up } (i1/i2 \times j)\} - i1/i2 \times j] = 64 \times [\{\text{value obtained by rounding up } (5.625/2 \times j)\} - 5.625/2 \times j] \quad (15)$$

By performing the computation of Expression (15), for the waveforms Sa1 to Sa16, the following results are obtained:

t1=0, 12, 24, 36, 48, 60, 8, 20, 32, 44, 56, 4, 16, 28, 40 and 52

Specifically, the detailed results are as follows:

When t1=0, j=0;
when t1=12, j=1;
when t1=24, j=2;
when t1=36, j=3:
when t1=48, j=4;
when t1=60, j=5;
when t1=8, j=6;
when t1=20, j=7;
when t1=32, j=8;
when t1=44, j=9;
when t1=56, j=10;
when t1=4, j=11;
when t1=16, j=12;
when t1=28, j=13;
when t1=40, j=14; and
when t1=52, j=15

Figure 9:
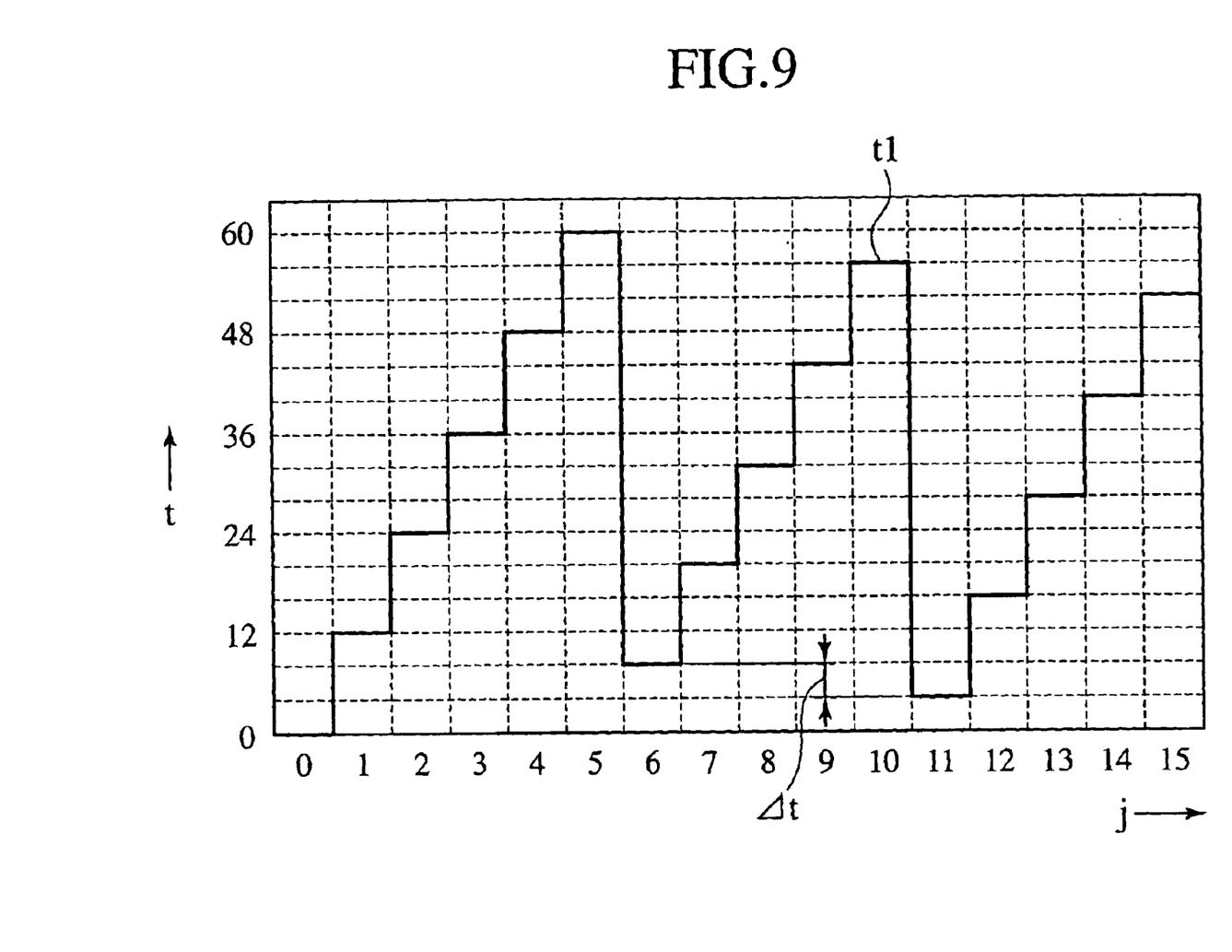
FIG. 9 is an explanatory diagram showing a relationship between t and j.

These values are shown in FIG. 9. From FIG. 9, it is understood that the values of t1 are changed in steps of $\Delta t$ ($\Delta t$=4).

Hence, by comparing the aforementioned values of t2 with the values of t1, the values of j can be identified. Specifically, the values of t1, in which Expression (16) is established, are calculated for the values of t2, which are obtained from the measurement, and the values of j can be identified based on the values of t1.

$$t1 \leq t2 < t1 + \Delta t \quad (16)$$

For example, when the value of t2 obtained based on the measurement data is "5", it is detected that j is equal to 11 because t1 is equal to 4 (4≤5<8).

The values of j represent the sequences (sequences starting from 0) of the periodic waveforms s2 (or s2') shown in FIG. 5 from the left side. Therefore, if the period (180° in this example) of the waveform s2 is multiplied by j and added with the detection value of s2', the absolute steering angle $\Theta$ can be calculated.

Specifically, the absolute steering angle $\Theta$ can be calculated by Expression (17) represented below.

$$\Theta = s2' + c2 \times j \quad (17)$$

where c2 is a period of the waveform s2.

The above is described with reference to FIG. 5. In the case where the foregoing value of t2 is equal to 5, when c2 is equal to 180°, the angle of 1980° (=180°×11) is calculated as the angle M1. Furthermore, the angle M2 (value of s2') is added to the angle M1, and thus the absolute steering angle $\Theta$ can be calculated.

Furthermore, the signal s1 is counted up and added to the absolute angle $\Theta$ as shown by Expression (18), and thus an absolute steering angle with higher resolving power can be obtained.

$$\alpha = \Theta + s1 \quad (18)$$

In addition, besides the above, it is also possible to adopt a configuration, in which combinations of signals s1 and s2 with respect to the angles are stored beforehand in a memory in the form of a data table, the stored combination is compared with a combination of measured signals s1 and s2, and thus the absolute steering angle is calculated.

Figure 10:
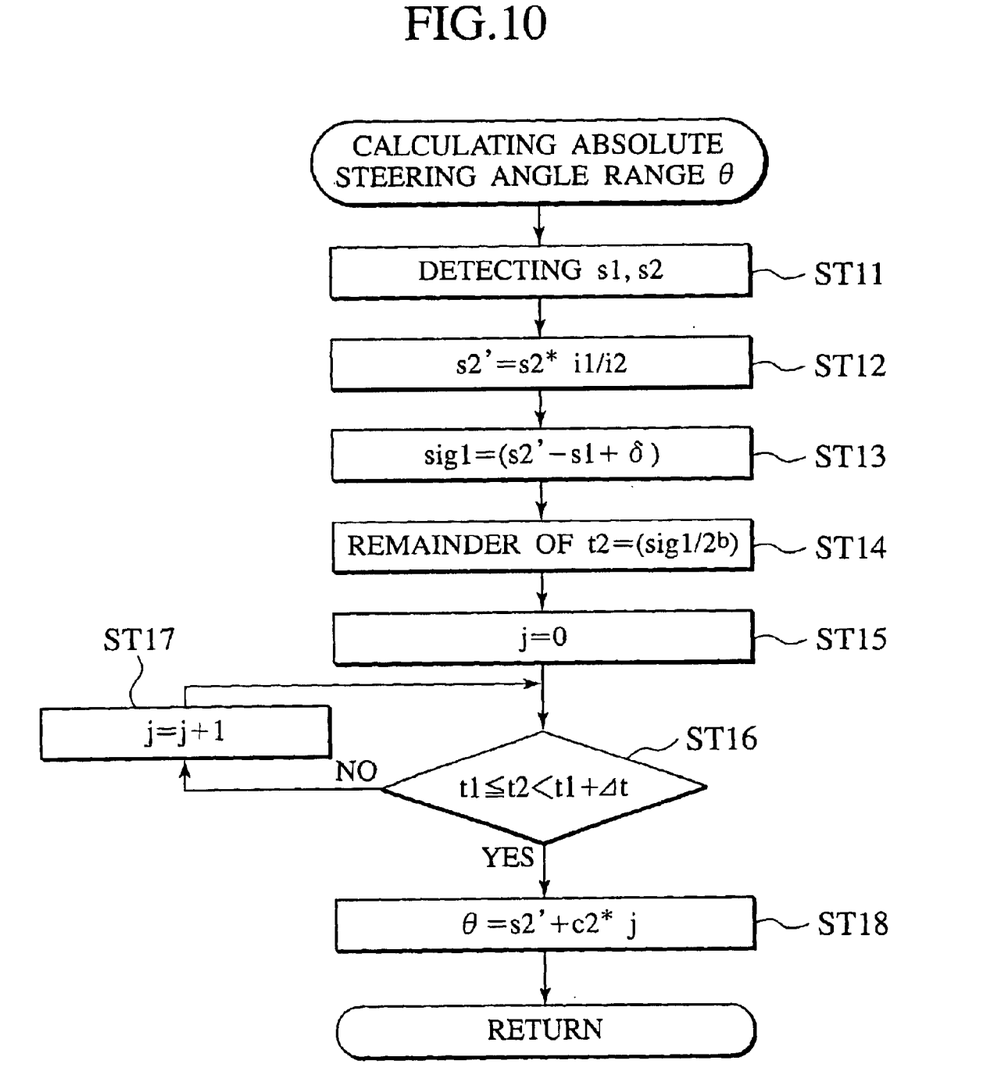
FIG. 10 is a flowchart showing an operation of a steering angle sensor according to a second embodiment of the present invention.

Next, the procedure of the foregoing process will be described with reference to the flowchart shown in FIG. 10.

First, the signals s1 and s2 are detected based on the detection signals of the magnetic sensors 11 and 13 (Step ST11). Subsequently, s2' is calculated by the foregoing Expression (11) (Step ST12). Thereafter, sig1 is calculated by Expression (13) (Step ST13), and t2 is calculated by Expression (14) (Step ST14).

Then, j is sequentially incremented for t2 calculated in Step ST14, and the value of t1 of when Expression (16) is established is calculated (Steps ST15 to ST17).

Thereafter, the absolute steering angle $\Theta$ is obtained by Expression (17) by use of the value of j corresponding to the calculated value of t1 (Step ST18).

As described above, the steering angle sensor according to this embodiment is configured such that a waveform corresponding to the waveform of the current steering angle is detected from the 16 waveforms of the signal s2 based on the difference of the periods of the waveforms obtained in the magnetic sensor 11 and the magnetic sensor 13. Moreover, the least common multiple of the period of the signal s1 detected by the magnetic sensor 11 and the period of the signal s2 detected by the magnetic sensor 13 is set larger than the whole steering angle of the steering. Therefore, the values of the residues calculated as t2 (values obtained by Expression (14)) become different values in all the 16 waveforms, and the absolute steering angle $\Theta$ can be uniquely obtained.

As described above, according to the present invention, the second and third gears rotating in synchronization with the first gear are provided, in which the second gear is set to rotate at a rotation speed faster than that of the first gear, and the third gear is set to rotate at a rotation speed slower than that of the second gear. Hence, the absolute steering angle of the steering shaft can be obtained securely and easily by detecting the rotational positions of the second and third gears.

Moreover, if the detection data by the small angle detection magnetic sensor and the detection data by the large angle detection magnetic sensor are set different in accordance with the absolute angle position of the steering shaft, the steering angle of the steering shaft is uniquely defined by the rotational positions of the second and third gears. Thus, it is possible to detect the steering angle more accurately.

What is claimed is:

1. A steering angle sensor, comprising:
    a first gear rotating in synchronization with a steering shaft;
    a second gear rotating in synchronization with the first gear at a rotation speed faster than a rotation speed of the first gear;
    a small angle detection magnet provided on the second gear and rotating together with the second gear;
    a small angle detection magnetic sensor disposed in a vicinity of where the second gear is fixed and configured to detect a magnetic line of force of the small angle detection magnet;
    a third gear rotating at a rotation speed slower than the rotation speed of the second gear in synchronization with the first gear;
    a large angle detection magnet provided on the third gear and rotating together with the third gear; and
    a large angle detection magnetic sensor disposed in a vicinity of where the third gear is fixed and configured to detect a magnetic line of force of the large angle detection magnet,
    wherein a rotation angle of the steering shaft is calculated based on angle data detected in the small angle detection magnetic sensor and the large angle detection magnetic sensor.

2. The steering angle sensor according to claim 1,
    wherein the small angle detection magnetic sensor supplies a periodic signal of a triangular wave accompanied by a rotational movement of the second gear, and
    the large angle detection magnetic sensor supplies a periodic signal of a triangular wave accompanied by a rotational movement of the third gear, the periodic signal having a longer period than a period of the periodic signal supplied by the small angle detection magnetic sensor.

3. The steering angle sensor according to claim 1,
    wherein detection data by the small angle detection magnetic sensor and detection data by the large angle detection magnetic sensor are set different in accordance with an absolute angular position of the steering shaft.

4. The steering angle sensor according to claim 3,
    wherein a signal, in which a gradient of a detection value detected by the large angle detection magnetic sensor is made to coincide with a gradient of a detection value detected by the small angle detection magnetic sensor, is created as a conversion signal, and
    a difference between the conversion signal and a detection result by the small angle detection magnetic sensor is calculated, and it is determined as to which period in a periodic waveform supplied from the large angle detection magnetic sensor an absolute steering angle of the steering shaft belongs in accordance with a value of a remainder of when a value of the difference is divided by a predetermined number of steps.

* * * * *